US010207620B1

(12) United States Patent
Watkins et al.

(10) Patent No.: US 10,207,620 B1
(45) Date of Patent: Feb. 19, 2019

(54) LIFT SYSTEMS AND METHODS FOR SUPPORTING CARGO ON A VEHICLE

(71) Applicant: Easy Lift Inc., Great Falls, MT (US)

(72) Inventors: Bruce Len Watkins, Great Falls, MT (US); Martin Harvey, Great Falls, MT (US)

(73) Assignee: Easy Lift Inc., Great Falls, MT (US)

( * ) Notice: Subject to any disclaimer, the term of this patent is extended or adjusted under 35 U.S.C. 154(b) by 0 days.

(21) Appl. No.: 15/458,576

(22) Filed: Mar. 14, 2017

(51) Int. Cl.
| | |
|---|---|
| *B60P 1/43* | (2006.01) |
| *B60P 3/07* | (2006.01) |
| *B60P 1/34* | (2006.01) |
| *B60P 1/28* | (2006.01) |

(52) U.S. Cl.
CPC ............... *B60P 1/433* (2013.01); *B60P 1/283* (2013.01); *B60P 1/34* (2013.01); *B60P 3/07* (2013.01)

(58) Field of Classification Search
CPC .... B60P 1/02; B60P 1/433; B60P 1/34; B60P 1/4407; B60P 1/4492; B60P 1/6463; B60P 1/64; B60P 1/4414; B60P 1/06; B60P 3/07; B60P 3/122
USPC ....... 414/471, 477, 475, 495, 540, 541, 545, 414/546, 547
See application file for complete search history.

(56) References Cited

U.S. PATENT DOCUMENTS

| | | | | |
|---|---|---|---|---|
| 3,257,011 A * | 6/1966 | Randall | ................. | B60P 1/4414 414/557 |
| 4,124,099 A * | 11/1978 | Dudynskyj | ........... | B60P 1/4414 280/166 |
| 4,147,261 A * | 4/1979 | Dautel | .................. | B60P 1/4478 414/557 |
| 5,100,282 A * | 3/1992 | Maier | .................. | B60P 1/4414 414/545 |
| 5,641,262 A * | 6/1997 | Dunlop | ................. | B60P 1/4414 254/10 R |
| 5,662,453 A * | 9/1997 | Gerstner | ................... | B60P 1/02 293/118 |
| 6,152,674 A * | 11/2000 | Ogrodnick | ............ | B60P 1/6463 414/491 |
| 6,450,742 B1 * | 9/2002 | Jenkins | ..................... | B60P 3/08 410/24 |
| 6,457,931 B1 * | 10/2002 | Chapman | .............. | B60P 1/6463 414/462 |
| 6,695,287 B1 * | 2/2004 | De Boer | ................. | B60P 3/122 254/10 C |

(Continued)

*Primary Examiner* — Kaitlin S Joerger

(74) *Attorney, Agent, or Firm* — Michael R. Schacht; Schacht Law Office, Inc.

(57) ABSTRACT

A lift system for supporting cargo on a vehicle comprising a vehicle frame, the lift system comprising a cargo platform assembly and a displacement system. The displacement system comprises a lift frame assembly, a drive system, at least one drive link assembly, and at least one stabilizer link assembly. Operation of the drive system causes axial rotation of the at least one drive axle. Axial rotation of the at least one drive axle causes the at least one drive link assembly to pivot about the drive axle axis. Pivoting of the at least one drive link assembly the drive axle axis displaces the cargo platform between a stowed configuration and a lowered configuration. Displacement of the cargo platform between the stowed configuration and the lowered configuration causes rotation of the at least one stabilizer link assembly.

18 Claims, 11 Drawing Sheets

(56) References Cited

U.S. PATENT DOCUMENTS

| | | | | |
|---|---|---|---|---|
| 6,698,994 | B2* | 3/2004 | Barrett | B60P 3/07 414/462 |
| 6,981,835 | B1* | 1/2006 | Groth | B60P 3/062 410/4 |
| 7,189,048 | B2* | 3/2007 | Rinderknecht | B60P 1/483 212/255 |
| 7,300,239 | B2* | 11/2007 | Benedikt | B60P 1/6463 414/477 |
| 7,341,420 | B1* | 3/2008 | Anderson | B66F 7/02 414/469 |
| 8,061,754 | B1* | 11/2011 | Webb | B60P 3/122 14/71.1 |
| 8,534,981 | B1* | 9/2013 | Bortz | B60P 1/486 414/462 |
| 9,090,200 | B2* | 7/2015 | Maier | B60P 1/4471 |
| 9,707,880 | B2* | 7/2017 | Ochenkowski | B60P 1/4442 |
| 9,821,699 | B2* | 11/2017 | Clark | B60P 1/433 |
| 2002/0164239 | A1* | 11/2002 | Angermeier | B60P 1/16 414/480 |
| 2005/0129490 | A1* | 6/2005 | Hutchins | B60P 1/4414 414/462 |
| 2005/0254925 | A1* | 11/2005 | Braquet | B60P 1/4414 414/462 |
| 2006/0182573 | A1* | 8/2006 | Taylor | B60P 1/02 414/477 |
| 2008/0159838 | A1* | 7/2008 | Sherer | B60P 1/435 414/537 |
| 2009/0035116 | A1* | 2/2009 | Johnson | B60P 1/483 414/631 |
| 2010/0124479 | A1* | 5/2010 | Brooks | B60P 1/4414 414/557 |
| 2013/0149086 | A1* | 6/2013 | Railsback | B60P 1/6463 414/478 |

* cited by examiner

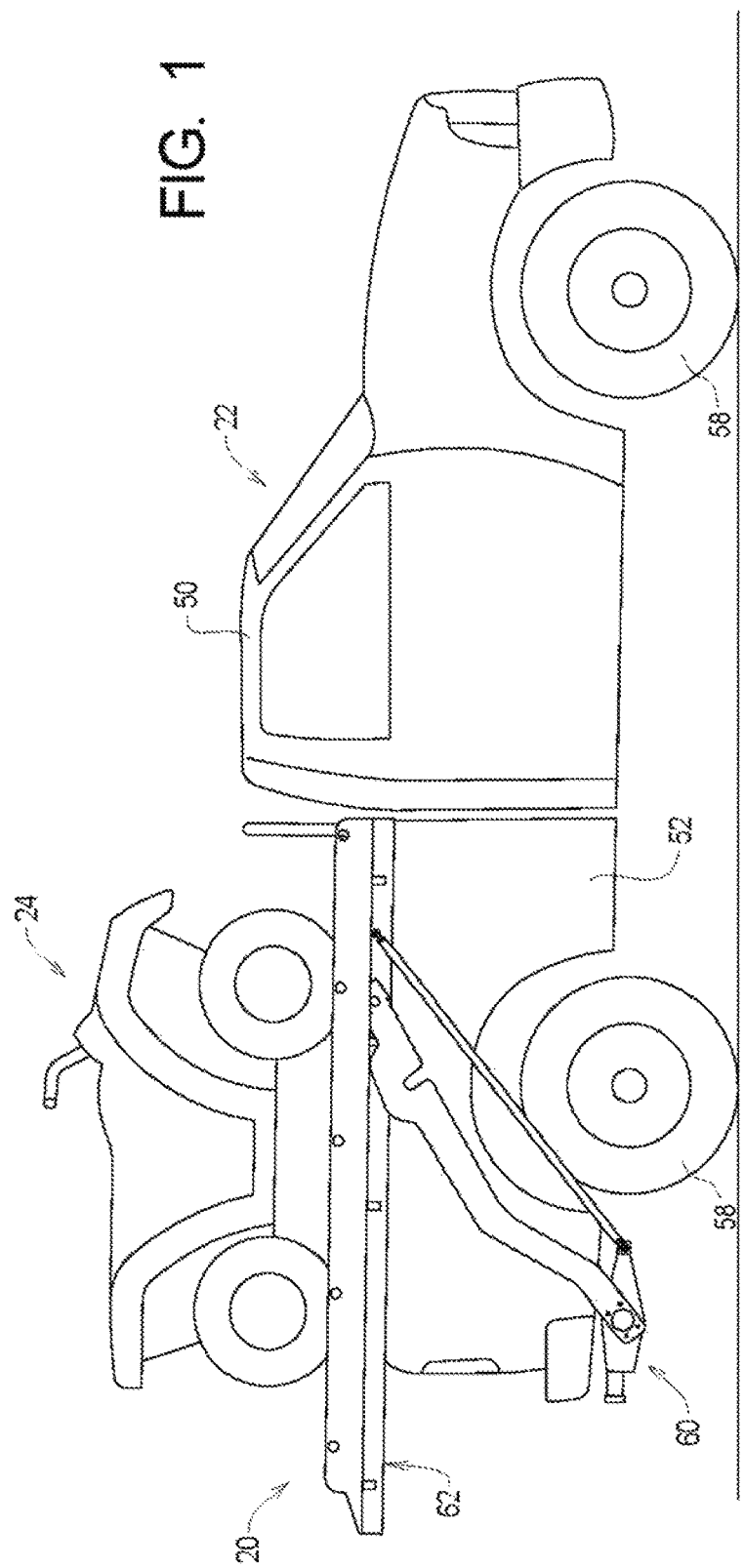

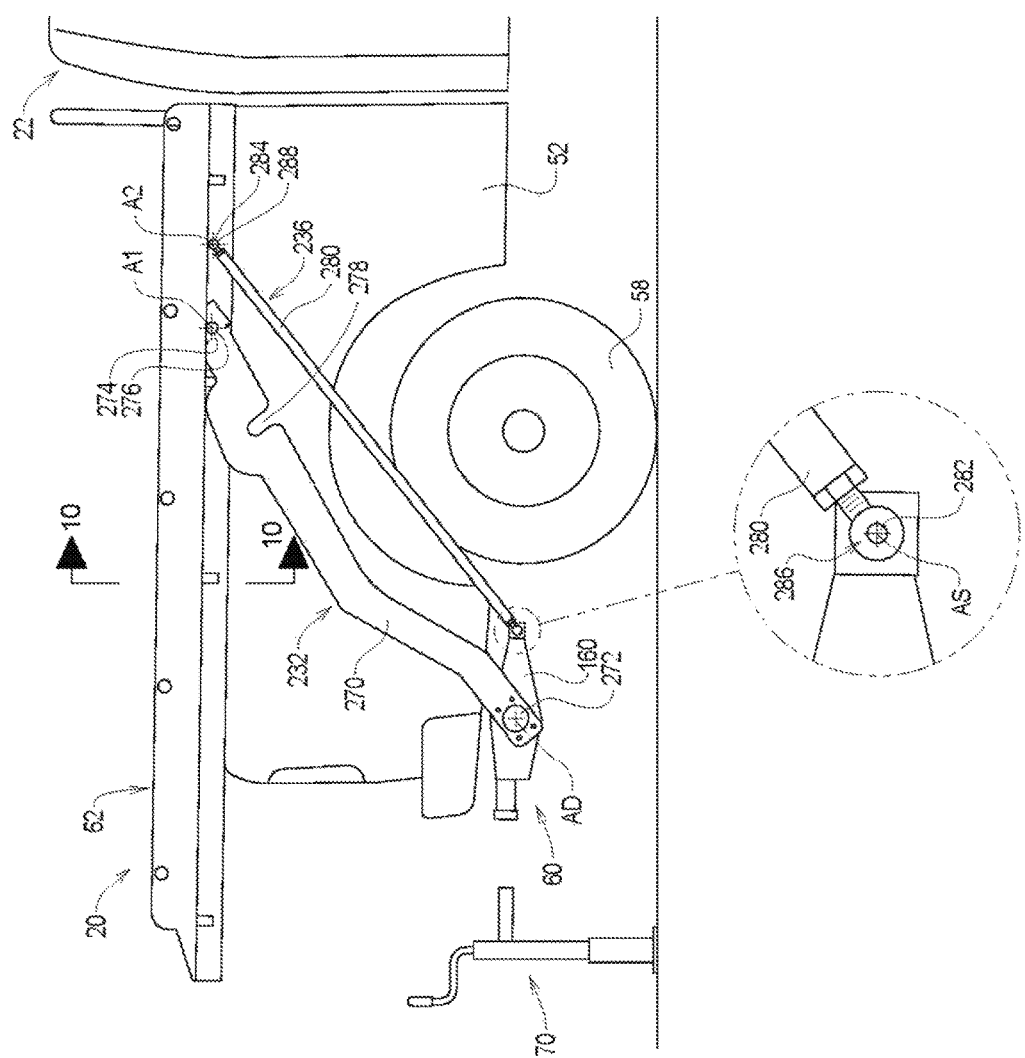

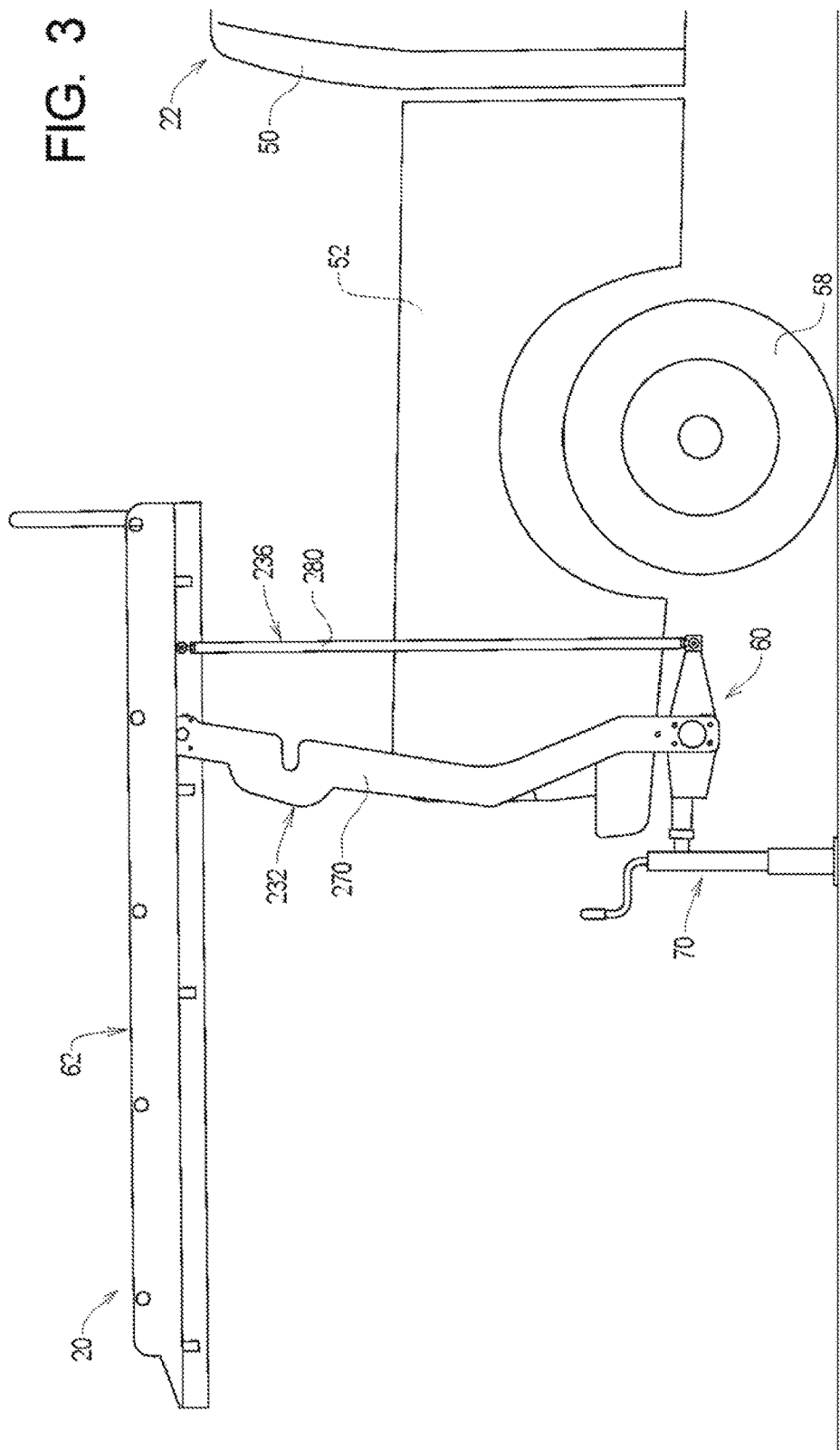

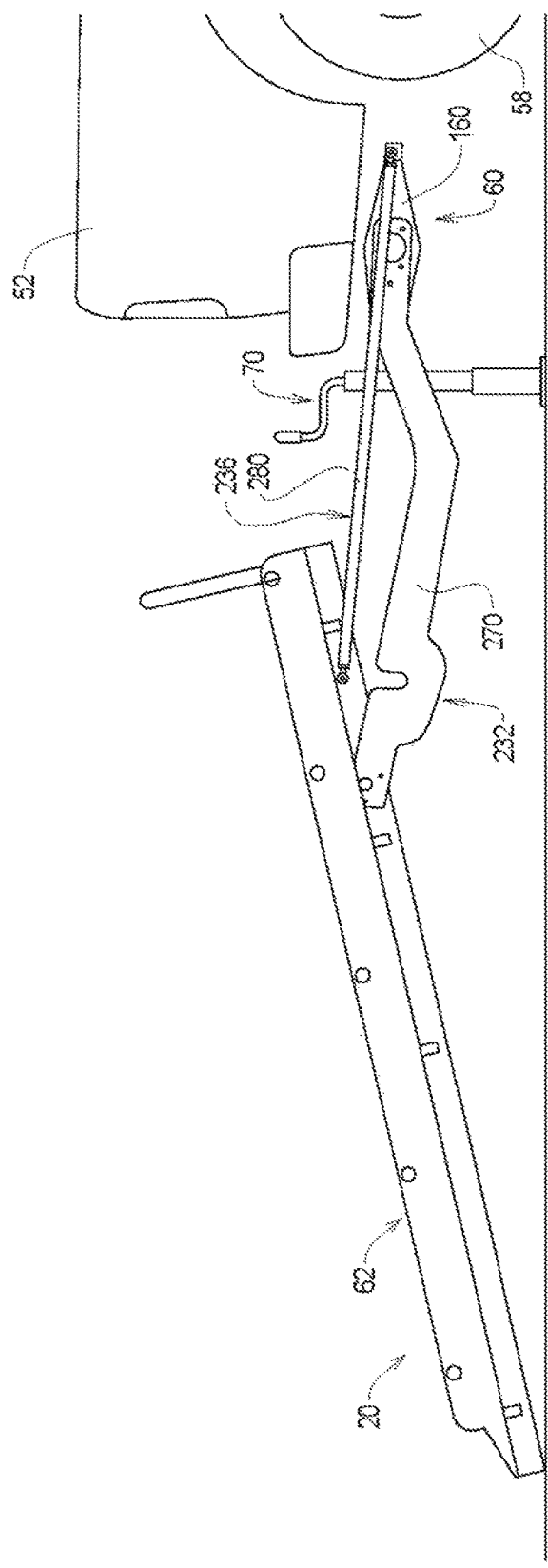

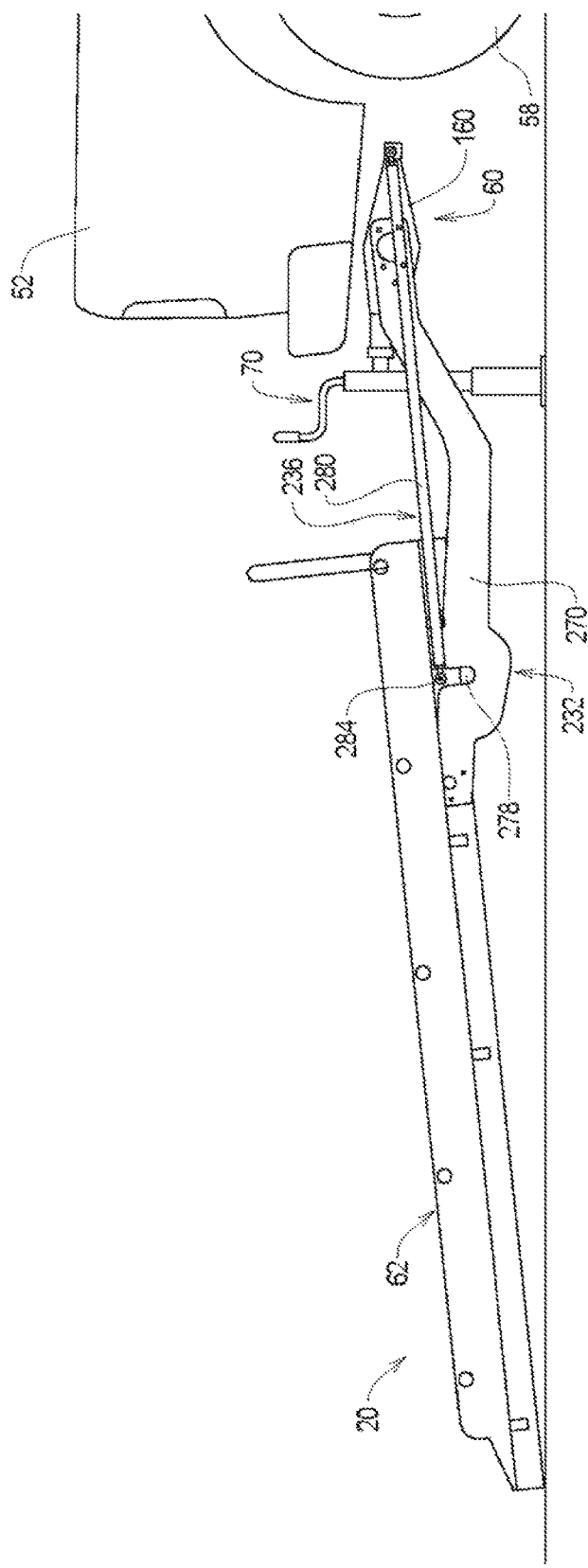

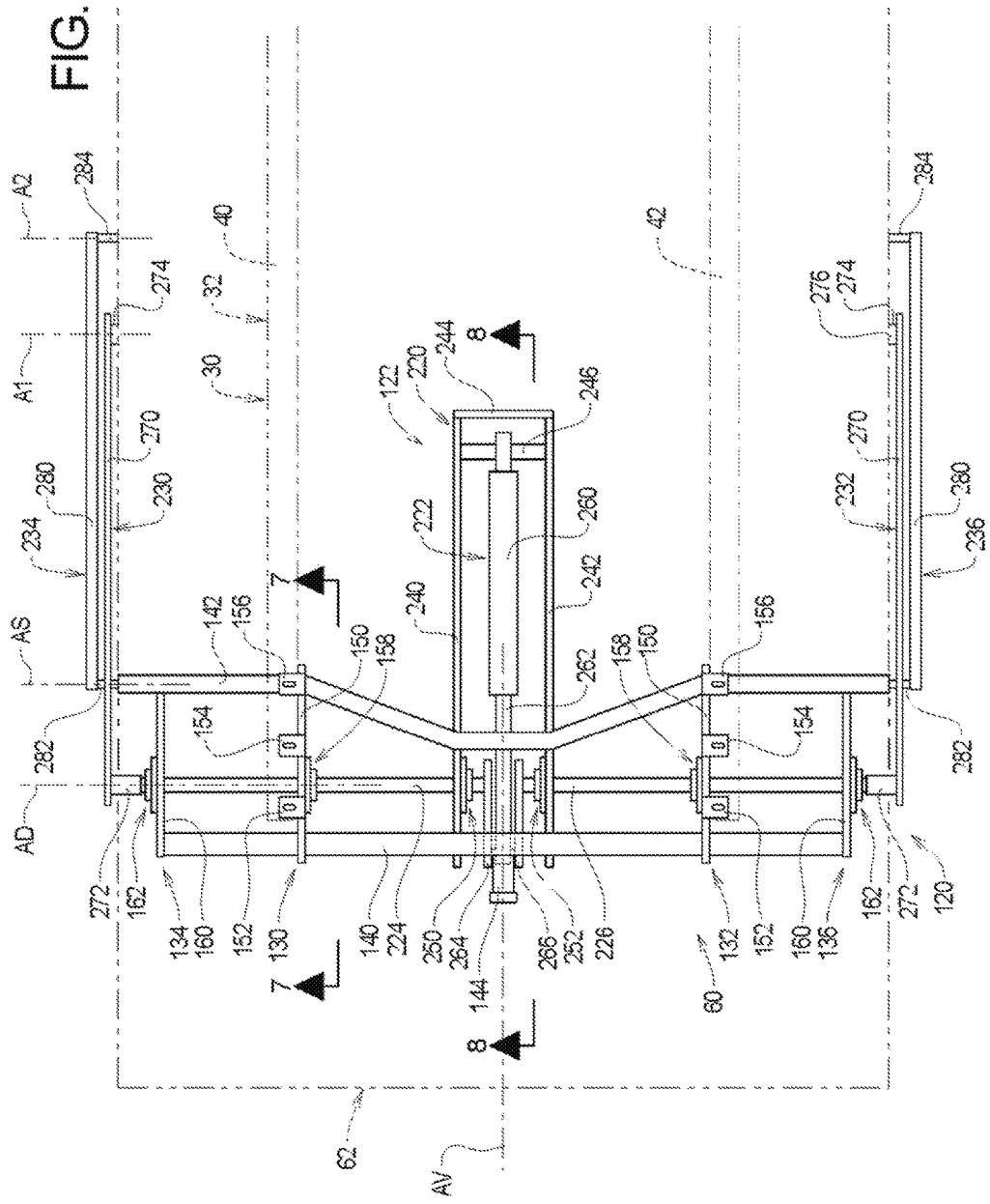

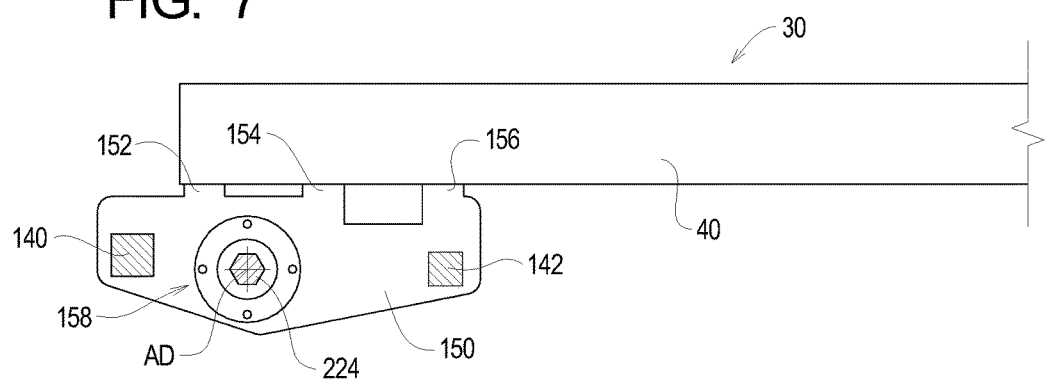
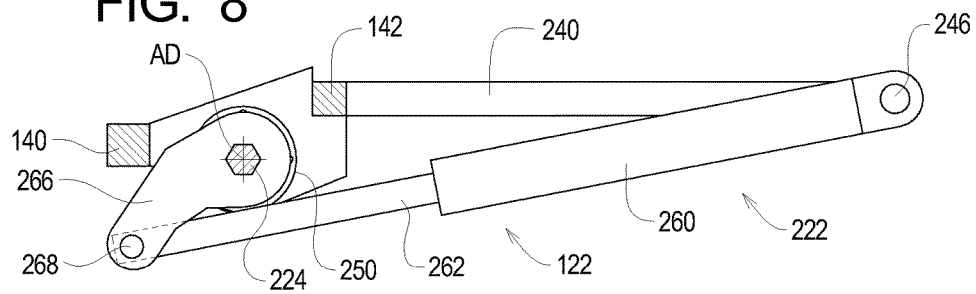
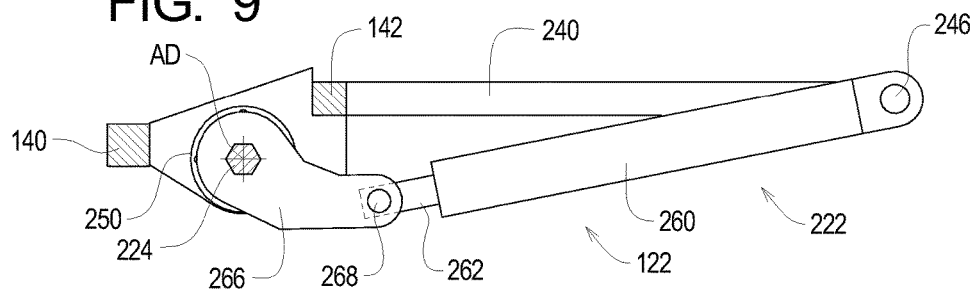

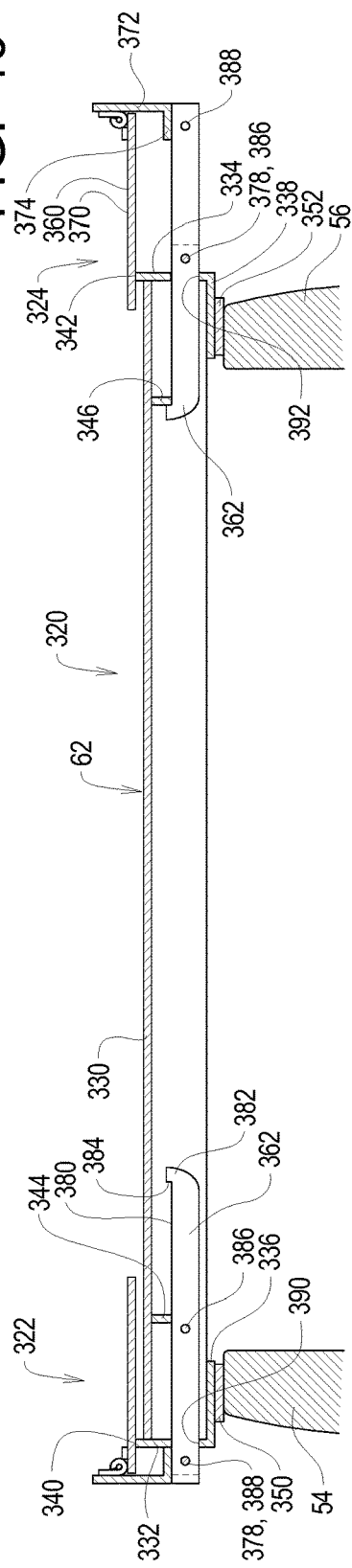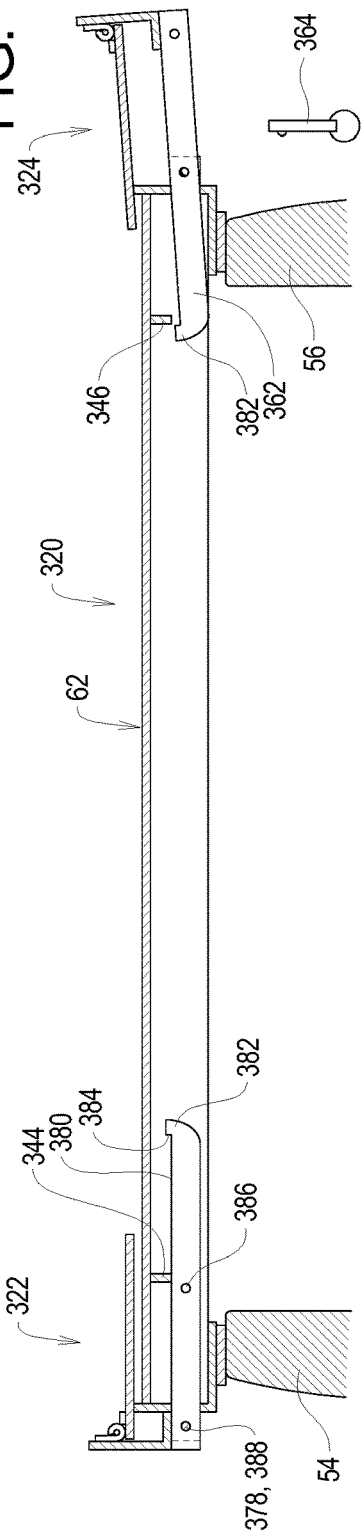

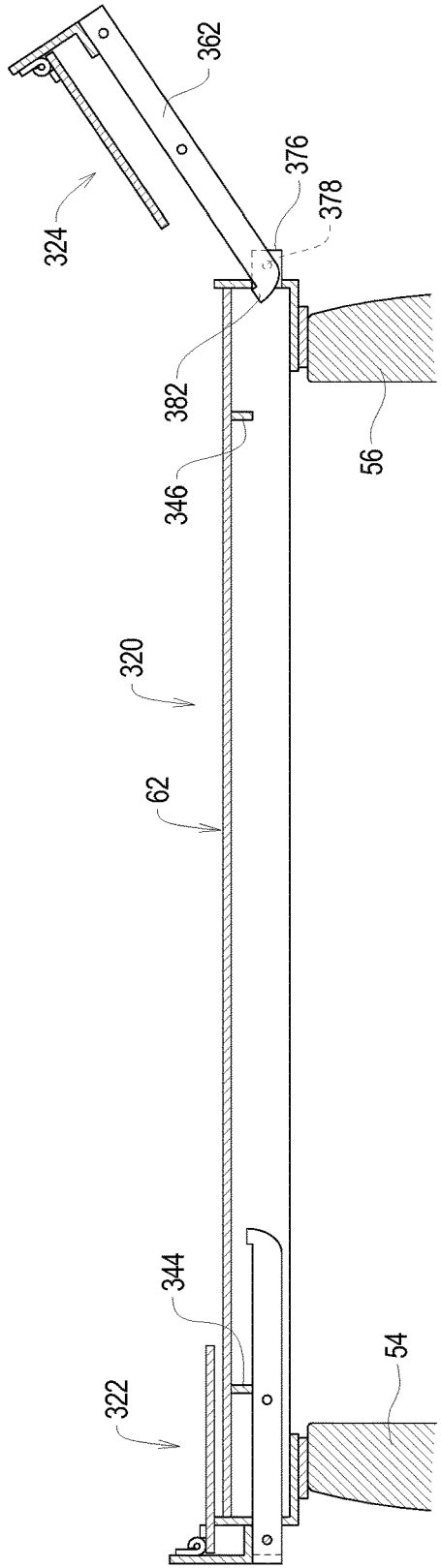

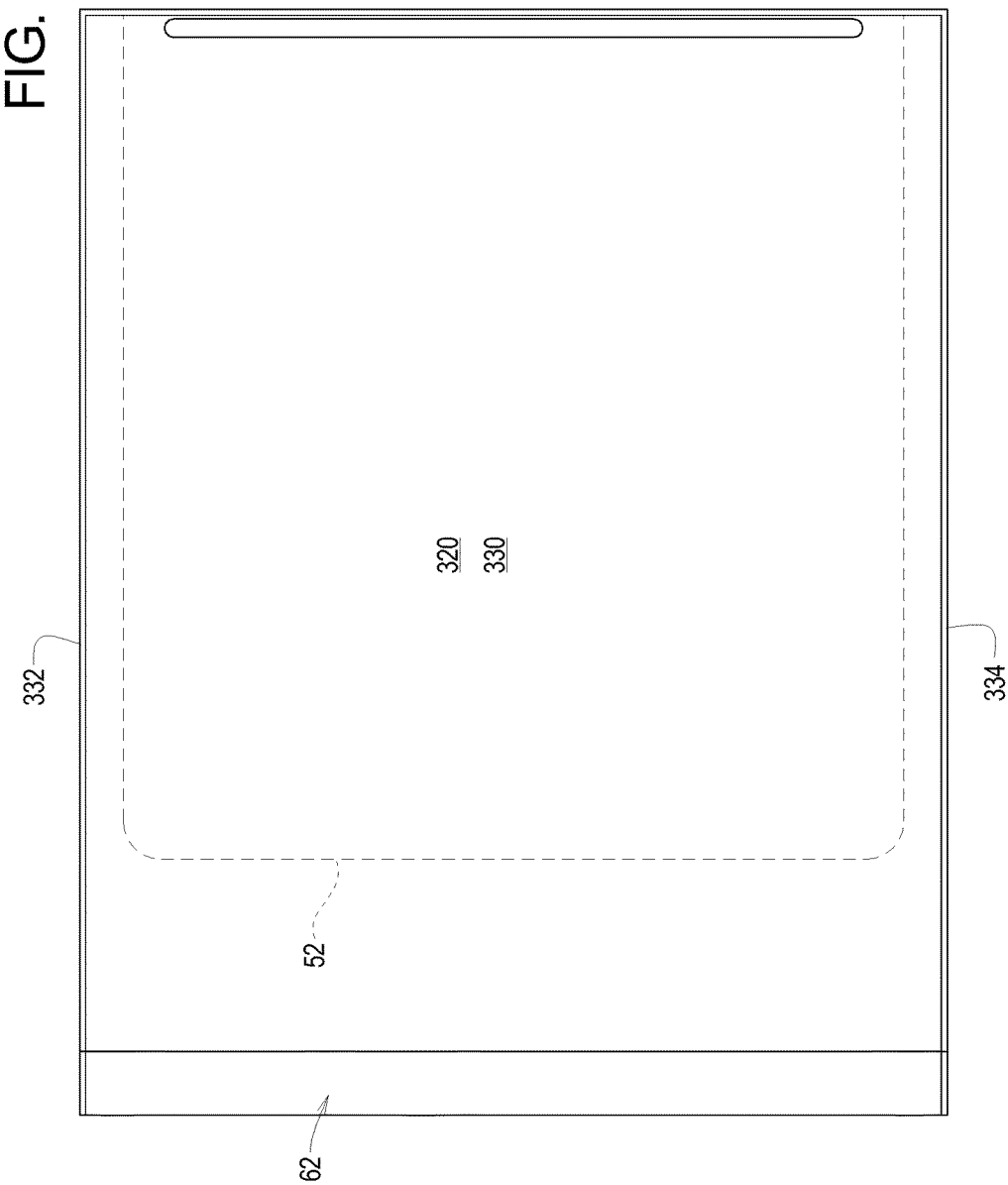

LIFT SYSTEMS AND METHODS FOR SUPPORTING CARGO ON A VEHICLE

TECHNICAL FIELD

The present invention relates to systems and methods for lifting cargo and, in particular, to vehicle mounted lift systems and methods for cargo such as a secondary vehicle.

BACKGROUND

It is common to use a vehicle to transport heavy loads. It is also common to use a primary vehicle to transport a load in the form of a secondary vehicle. When the secondary vehicle is a motorized vehicle such as an ATV, motorcycle, or snow mobile, the secondary vehicle may be too heavy to be lifted onto the primary vehicle by hand.

The present invention is of particular significance when the primary vehicle is a pickup truck and the cargo is one or more ATVs, and the present invention will be described herein in that context. However, the present invention may have application to primary vehicles other than pickup trucks and to loads other than motorized secondary vehicles such as an ATV.

Ramps may be used to allow a secondary vehicle to be driven onto the bed of a pickup truck. However, the bed of a pickup truck defines a relatively small useable surface area for supporting a secondary vehicle. Accordingly, a carrier platform may be supported above the bed of the pickup truck. The carrier platform extends beyond the bed of the pickup truck to provide sufficient useable surface area for two secondary vehicles such as ATV's to be carried in a side-by-side orientation. Side-by-side ATV carriers require the use of a steep ramp to allow onloading and offloading of the ATV's. Further, when not in use, the side-by-side ATV carrier extends significantly beyond the side of the pickup truck.

The need exists for improved load platforms that facilitate the onloading and offloading of loads on vehicles.

SUMMARY

The present invention may be embodied as a lift system for supporting cargo on a vehicle comprising a vehicle frame, the lift system comprising a cargo platform assembly and a displacement system. The cargo platform assembly is configured to support the cargo. The displacement system comprises a lift frame assembly, a drive system, at least one drive link assembly, and at least one stabilizer link assembly. The lift frame assembly is rigidly connected to the vehicle frame. The drive system is operatively connected to the lift frame assembly for axially rotating at least one drive axle about a drive axle axis. The at least one drive link assembly is supported for pivoting movement relative to the lift frame assembly about the drive axle axis and to the cargo platform assembly about a first distal axis. The at least one drive axle is operatively connected to the at least one drive link assembly. The at least one stabilizer link assembly is supported for pivoting movement relative to the lift frame assembly about a stabilizer axis and to the cargo platform assembly about a second distal axis. Operation of the drive system causes axial rotation of the at least one drive axle. Axial rotation of the at least one drive axle causes the at least one drive link assembly to pivot about the drive axle axis. Pivoting of the at least one drive link assembly about the drive axle axis displaces the cargo platform between a stowed configuration and a lowered configuration. Displacement of the cargo platform between the stowed configuration and the lowered configuration causes rotation of the at least one stabilizer link assembly.

The present invention may also be embodied as a method of supporting cargo on a vehicle comprising a vehicle frame, the method comprising the following steps. A cargo platform assembly configured to support the cargo is provided. A lift frame assembly is rigidly connected to the vehicle frame. A drive system is operatively connected to the lift frame assembly for axially rotating at least one drive axle about a drive axle axis. The at least one drive axle is operatively connected to the at least one drive link assembly for pivoting movement relative to the lift frame assembly about the drive axle axis. The at least one drive link assembly is operatively connected to the cargo platform assembly for pivoting movement about a first distal axis. The at least one stabilizer link assembly is supported for pivoting movement relative to the lift frame assembly about a stabilizer axis. The at least one stabilizer link assembly is operatively connected to the cargo platform assembly for pivoting movement about a second distal axis. The drive system is operated to cause axial rotation of the at least one drive axle. Axial rotation of the at least one drive axle causes the at least one drive link assembly to pivot about the drive axle axis. Pivoting of the at least one drive link assembly the drive axle axis displaces the cargo platform between a stowed configuration and a lowered configuration. Displacement of the cargo platform between the stowed configuration and the lowered configuration causes rotation of the at least one stabilizer link assembly.

The present invention may also be embodied as a lift system for supporting cargo on a vehicle comprising a vehicle frame comprising a cargo platform and a displacement system. The cargo platform assembly is configured to support the cargo and comprises a main platform assembly and at least one extension platform assembly supported for movement between a retracted position and an extended position relative to the main platform assembly. The displacement system comprises a lift frame assembly, a drive system, first and second drive link assemblies, and first and second stabilizer link assemblies. The lift frame assembly is rigidly connected to the vehicle frame. The drive system is operatively connected to the lift frame assembly for axially rotating at least one drive axle about a drive axle axis. The first and second drive link assemblies are supported for pivoting movement relative to the lift frame assembly about the drive axle axis and to the cargo platform assembly about a first distal axis. The at least one drive axle is operatively connected to the first and second drive link assemblies. The first and second stabilizer link assemblies are supported for pivoting movement relative to the lift frame assembly about a stabilizer axis and to the cargo platform assembly about a second distal axis. Operation of the drive system causes axial rotation of the at least one drive axle. Axial rotation of the at least one drive axle causes the first and second drive link assemblies to pivot about the drive axle axis. Pivoting of the first and second drive link assemblies the drive axle axis displaces the cargo platform between a stowed configuration and a lowered configuration. Displacement of the cargo platform between the stowed configuration and the lowered configuration causes rotation of the first and second stabilizer link assemblies.

BRIEF DESCRIPTION OF THE DRAWINGS

FIG. 1 is a side elevation view of a first example cargo lift system of the present invention being used to support a load in the form of an ATV relative to a primary vehicle in the form of a pickup truck, the first example cargo lift system being shown in a stowed configuration;

FIG. 2 is a side elevation view illustrating a first step in the process of loading cargo with the first example cargo lift system, the first example cargo lift system being shown in the stowed configuration;

FIG. 3 is a side elevation view illustrating a second step in the process of loading cargo with the first example cargo lift system, the first example cargo lift system being shown in a first intermediate configuration;

FIG. 4 is a side elevation view illustrating a third step in the process of loading cargo with the first example cargo lift system, the first example cargo lift system being shown in a second intermediate configuration;

FIG. 5 is a side elevation view illustrating a third step in the process of loading cargo with the first example cargo lift system, the first example cargo lift system being shown in a lowered configuration;

FIG. 6 is a top plan view of a portion of the primary vehicle and a portion of the first example cargo lift system;

FIG. 7 is a section view taken along lines 7-7 in FIG. 6;

FIG. 8 is a section view taken along lines 8-8 in FIG. 6;

FIG. 9 is a section view similar to FIG. 8 but with the first example cargo lift system being shown in the lowered configuration;

FIG. 10 is a rear section view taken along lines 10-10 in FIG. 2 of the example cargo platform assembly of the first example cargo lift system, with a first platform extension of the cargo platform assembly retracted and a second platform extension of the cargo platform assembly extended;

FIGS. 11 and 12 are rear section views of the example cargo platform assembly of the first example cargo lift system, with the first platform extension of the cargo platform assembly retracted and the second platform extension of the cargo platform assembly being removed;

FIG. 14 is a top plan view of the example cargo platform assembly of the first example cargo lift system, with the first and second platform extensions of the cargo platform assembly removed.

DETAILED DESCRIPTION

Figure 13:
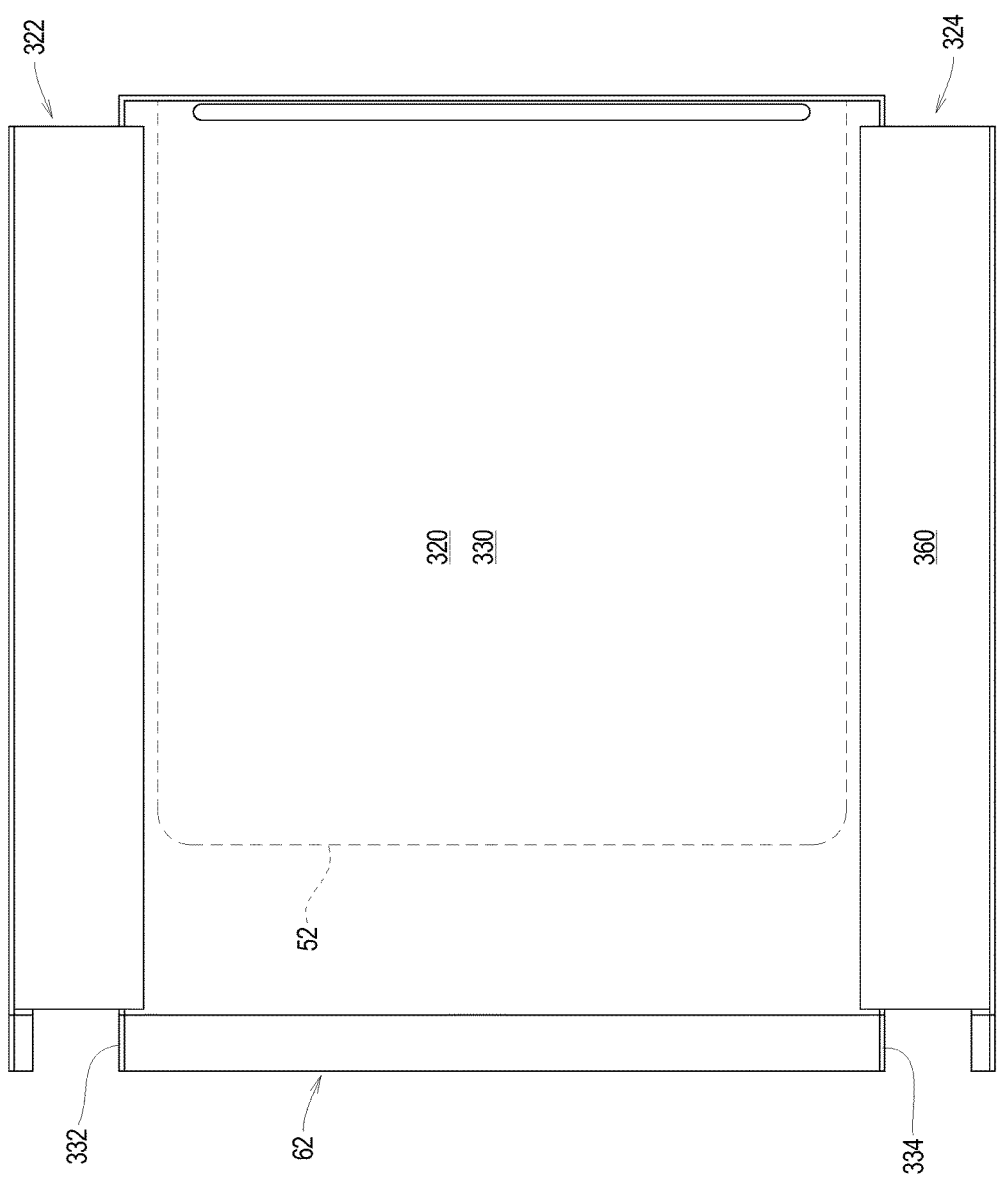
FIG. 13 is a top plan view of the example cargo platform assembly of the first example cargo lift system, with the first and second platform extensions of the cargo platform assembly extended.

Referring initially to FIG. 1 of the drawing, depicted therein is a first example cargo lift system 20 constructed in accordance with, and embodying, the principles of the present invention. The first example cargo lift system 20 is configured to be supported by a primary vehicle 22 and to support a load 24. In the example depicted in FIG. 1, the primary vehicle 22 is a pickup truck and the load 24 is an ATV, but the first example lift system 20 may be used with other types of primary vehicles and secondary vehicles.

The example primary vehicle 22 and secondary vehicle 24 are not per se part of the present invention and will be described herein only to that extent necessary for a complete understanding of the present invention. The example primary vehicle 22 comprises a vehicle frame 30 and a vehicle chassis 32. As perhaps best shown in FIG. 6, the example vehicle frame 30 defines first and second frame rails 40 and 42. The vehicle chassis defines a vehicle cab 50 and a vehicle bed 52. The example vehicle bed 52 defines first and second bed walls 54 and 56 as perhaps best shown in FIGS. 10-12. The example primary vehicle 22 is supported wheels 58.

FIGS. 1-5 of the drawing illustrate that the first example cargo lift system 20 comprises a displacement system 60 and a cargo platform assembly 62. The example cargo lift system 20 may optionally further comprises a hitch jack assembly 70 for supporting the primary vehicle 22 during use of the first example cargo lift system 20 to load the load 24 onto and unload the load 24 from the primary vehicle 22.

As shown in FIGS. 1 and 2, the first example cargo lift system 20 may be arranged in a stowed configuration in which the cargo platform assembly 62 and load 24 are supported above the bed 52 of the primary vehicle 22. Operation of the displacement system 60 is capable of displacing the cargo platform assembly 62, and the load 24 thereon, from the stowed configuration, through a continuum of intermediate configurations (e.g., FIGS. 3 and 4) and into a lowered configuration as shown in FIG. 5.

In the lowered configuration, at least a portion of the cargo platform assembly 62 is in contact with the ground, and the cargo 24 may easily be removed from the cargo platform assembly 62. In the example depicted in FIGS. 1-5, the ATV forming the load 24 may simply be driven off the cargo platform assembly 62 and onto the ground. To load the load 24 onto the vehicle 22, the first example cargo lift system 20 is arranged in the lowered configuration, the load 24 is arranged on the example cargo platform assembly 62, and the displacement system 60 is operated to reconfigure the first example cargo lift system 20 from the lowered configuration back to the stowed configuration.

As can be seen by a comparison of FIGS. 1-5, the cargo platform assembly 62 is substantially horizontal as the first example cargo lift system 20 is reconfigured between the raised and lower configurations.

Referring now to FIGS. 6-9, the example displacement system 60 will now be described in further detail. The example displacement system 60 comprises a lift frame assembly 120 and a drive system 122.

The example lift frame assembly 120 comprises first and second connecting assemblies 130 and 132, first and second support assemblies 134 and 136, first and second brace members 140 and 142, and, if the hitch jack assembly 70 is used, a hitch receiver 144 that allows the hitch jack assembly 70 to support and stabilize the rear end of the primary vehicle 22. The first and second connecting assemblies 130 and 132 are rigidly attached to the first and second frame rails 40 and 42 of the vehicle frame 30. In the example lift frame assembly 120, the first and second connecting assemblies 130 and 132 are detachably attached to the first and second frame rails 40 and 42 by bolts (not shown).

The first and second brace members 140 and 142 are rigidly connected to the first and second connecting assemblies 130 and 132 such that the first and second brace members 140 and 142 are rigidly supported relative to the frame rails 40 and 42 during normal use of the first example cargo lift system 20. The first and second brace members 140 and 142 are rigidly connected to the first and second support assemblies 134 and 136 such that the first and second support assemblies 134 and 136 are also rigidly supported relative to the frame rails 40 and 42 during normal use of the first example cargo lift system 20.

As depicted in FIG. 6, the primary vehicle 22 defines a vehicle axis AV that is equidistant from the first and second frame rails 40 and 42. In this context, lateral directions towards the vehicle axis AV are inward, and lateral directions away from the vehicle axis AV are outward. Directions toward the cab 50 from the bed 52 along the vehicle axis AV are forward, and directions away from the cab 50 towards the bed 52 are rearward. The example lift frame assembly 120 is configured such that the first and second support assemblies 134 and 136 are located outward relative to the first and second connecting assemblies 130 and 132, respectively.

The example first and second connecting assemblies 130 and 132 may be the same but need not be identical. In the example lift frame assembly 120, the example first and second connecting assemblies 130 and 132 are the same, and only the example first connecting assembly 130 will be described herein in detail with the understanding that this explanation also applies to the example second connecting assembly 132.

FIG. 6 illustrates that the example first connecting assembly 130 comprises a connecting plate 150 defining first, second, and third mounting tabs 152, 154, and 156 and a connector bearing assembly 158. The example connecting plate 150 is sized, configured, and dimensioned to carry the loads placed thereon during operation of the first example cargo lift system 20 as described herein. The example mounting tabs 152, 154, and 156 are integrally formed with or rigidly connected to the connecting plate 150 to allow the connecting plate 150 to be rigidly connected to the first frame rail 40 by bolts extending through one or more of the mounting tabs 152, 154, and 156. The example connecting plate 150 is further rigidly connected to the first and second brace members 140 and 142. The example connector bearing assembly 158 is or may be conventional and is supported by the example connecting plate 150 to support the example drive system 122 as will be described in further detail below.

The example first and second support assemblies 134 and 136 may be the same but need not be identical. In the example lift frame assembly 120, the example first and second support assemblies 134 and 136 are the same, and only the example first support assembly 134 will be described herein in detail with the understanding that this explanation also applies to the example second support assembly 136.

In particular, the example first support assembly 134 comprises a support plate 160 and a support bearing assembly 162. The example support plate 160 is sized, configured, and dimensioned to carry the loads placed thereon during operation of the first example cargo lift system 20 as described herein. The example support plate 160 is further rigidly connected to the first and second brace members 140 and 142. The example support bearing assembly 162 is or may be conventional and is supported by the example support plate 160 to support the example drive system 122 as will be described in further detail below.

FIG. 6 further illustrates that the example drive system 122 comprises a drive frame assembly 220, an actuator system 222, first and second drive axles 224 and 226, first and second drive link assemblies 230 and 232, and first and second stabilizer link assemblies 234 and 236. While the example drive system 122 uses two drive axles 224 and 226, the two coaxially aligned drive axles 224 and 226 may be replaced by a single drive axle.

The example frame assembly 220 comprises first and second extension members 240 and 242, a cross member 244, an anchor member 246, and first and second drive bearing assemblies 250 and 252. The example actuator system 222 comprises a drive cylinder 260, a drive rod 262, first and second drive plates 264 and 266, and a drive pin 268. The cross member 244 is rigidly connected between the first and second extension members 240 and 242. The first and second extension members 240 and 242 are rigidly connected to the first and second brace members 140 and 142 such that the anchor member 246 is rigidly supported at a desired location relative to the vehicle frame 30. The example anchor member 246 in turn pivotably supports the drive cylinder 260. The example drive pin 268 connects the first and second drive plates 264 and 266 to the example drive rod 262. The example first and second drive bearing assemblies 250 and 252 are supported by the first and second extension members 240 and 242, respectively.

The example first and second drive link assemblies 230 and 232 may be the same but need not be identical. In the example lift frame assembly 120, the example first and second drive link assemblies 230 and 232 are the same, and only the example first drive link assembly 230 will be described herein in detail with the understanding that this explanation also applies to the example second drive link assembly 232.

FIGS. 2 and 6 illustrate that the first and second drive link assemblies 230 and 232 comprises a drive link member 270, a drive sleeve 272, a drive pin 274, and a drive link bearing assembly 276. FIG. 2 illustrates that a notch 278 is formed in the example drive link member 270. The drive sleeve 272 is connected to one end of the drive link member 270, and the drive pin 274 is connected to the other end of the drive link member 270. The drive sleeve 272 is configured to engage the drive axle 274 such that rotation of the drive axle 274 causes the drive link member 270 to pivot about drive axle axis AD. The drive link bearing assembly 276 is secured to a first portion of the cargo platform assembly 62 to define a first distal axis A1. The drive link member 270 is thus operatively connected to the first portion of the cargo platform assembly 62 such that pivoting movement of the drive link member 270 about the drive axle axis AD cause at least the first portion of the cargo platform assembly 62 (e.g., the first distal axis A1) to rotate in an arc about the drive axle axis AD.

The example first and second stabilizer link assemblies 234 and 236 may be the same but need not be identical. In the example lift frame assembly 120, the example first and second stabilizer link assemblies 234 and 236 are the same, and only the example first stabilizer link assembly 234 will be described herein in detail with the understanding that this explanation also applies to the example second stabilizer link assembly 236.

FIGS. 2 and 6 illustrate that the example first and second stabilizer link assemblies 234 and 236 comprises a stabilizer link assembly 280, first and second stabilizer pins 282 and 284, and first and second stabilizer bearing assemblies 286 and 288. The first stabilizer bearing assemblies 286 are supported by the support plates 160 along a stabilizer axis AS, and the second stabilizer bearing assemblies 288 are supported by the cargo platform assembly 62 to define a second distal axis A2. The first and second stabilizer pins 282 and 284 engage the first and second stabilizer bearing assemblies 286 and 288, respectively, such that, as the drive link member 270 pivots about the drive axle axis AD, the stabilizer link assemblies 234 and 236 pivot about the stabilizer axis AS. The stabilizer link assembly 280 defines a predetermined length such that, as the first portion of the cargo platform assembly 62 at the first distal axis A1 rotates in an arc about the drive axle axis AD, the stabilizer link assemblies 234 and 236 limit rotation of the cargo platform assembly 62 about the first distal axis A1. The inset in FIG. 2 illustrates that the length of the stabilizer link assembly 280 is adjustable to allow the predetermined length thereof to be adjusted for a particular configuration of the first example cargo lift system 20.

With the displacement system 60 constructed and assembled as described above, the example drive axles 224 and 226 engage and are supported by the bearing assemblies 158 of the first and second connector assemblies 130 and 132, by the bearing assemblies 162 of the first and second support assemblies 134 and 136, and by the first and second drive bearing assemblies 250 and 252, respectively, for axial rotation about the drive axle axis AD. The first and second drive plates 264 and 266 are in turn connected to the drive axle 224 such that extension of the drive rod 262 from and retraction of the drive rod 262 into the drive cylinder 260 causes axial rotation of the drive axles 224 and 226 about the shaft axis AD.

With the example lift frame assembly 120 constructed and secured to the frame rails 40 and 42 as described above and the drive axle 224 supported by the bearing assemblies 158, 162, 250, and 252, the example drive cylinder 260 and drive rod 262 are supported between the first and second frame rails 40 and 42. Further, the first brace member 140, second brace member 142, and drive axle 224 (and shaft axis AD defined thereby) are substantially transverse to and symmetrically arranged about the vehicle axis AV. The example stabilizer axis AS and distal axes A1 and A2 are similarly transverse to the vehicle axis AV during normal use of the first example cargo lift system 20. The drive axle axis AD, stabilizer axis AS, and distal axes A1 and A2 are all substantially parallel to each other.

As perhaps best shown in FIG. 6, the example drive link members 270 of the first and second drive link assemblies 230 and 232 are located outwardly of the first and second side walls 54 and 56, respectively. Further, the example stabilizer link members 280 of the first and second stabilizer link assemblies 234 and 236 are arranged outwardly from the example drive link members 270 of the first and second drive link assemblies 230 and 232, respectively. The notches 278 formed in the drive link members 270 accommodate the second stabilizer pins 284 of the stabilizer link assemblies 234 and 236 when the example cargo lift system 20 is in its lowered position.

In addition, FIGS. 1-5 illustrate that the axes AD and AS are located to the rear of rearmost set of wheels 58 of the vehicle 22. Axes A1 and A2 are located forward of the axis AD and AS when the example cargo lift system 20 is in its stowed configuration as shown in FIGS. 1 and 2. The weight of the example cargo platform assembly 62, and the load 24 thereon, is carried almost exclusively by the bed 52 when the example cargo lift system 20 is in the stowed configuration. The cargo platform assembly 62 and the axes A1 and A2 travel over the top of the axes AD and AS as the example cargo lift system 20 moves from the stowed configuration to the lowered configuration. In the lowered configuration, the axes A1 and A2 are sufficiently to the rear of the vehicle 22 that the vehicle 22 does not interfere with movement of the cargo platform assembly 62 and the load 24 carried thereon. In the lowered configuration and possibly earlier, at least a portion of the cargo platform assembly 62 and load 24 thereon is supported by the ground.

Turning now to FIGS. 10-14 of the drawing, the example cargo platform assembly 62 will now be described in further detail. The example cargo platform assembly 62 comprises a main platform 320 and first and second extension platforms 322 and 324. The main platform 320 defines a main wall 330, first and second side walls 332 and 334, and first and second bearing walls 336 and 338. The first and second side walls 332 and 334 define first and second spacing edges 340 and 342. First and second stop projections 344 and 346 extend from the main wall 330. The first and second bearing walls 336 and 338 are configured to be supported by upper surfaces of the first and second bed walls 54 and 56, respectively. Typically, first and second resilient pads 350 and 352 are arranged between the bearing walls 336 and 338 and the bed walls 54 and 56, respectively.

The example first and second extension platforms 322 and 324 may be the same but need not be identical. In the example lift frame assembly 120, the example first and second extension platforms 322 and 324 are the same, and only the example first extension platforms 322 will be described herein in detail with the understanding that this explanation also applies to the example second extension platform 324.

The example extension platform 322 comprises an extension member 360, at least one extension guide 362, and at least one lock pin 364. The example extension member 360 defines an extension wall 370, an outer wall 372, a return wall 374, and at least one lock flange 376. A flange opening 378 is formed in each lock flange 376. The at least one extension guide 362 defines an upper surface 380, a guide tip 382, a tip surface 384, and first and second lock openings 386 and 388.

The extension platforms 322 and 324 are movably supported by the main platform 320 to allow an overall width of the example cargo platform assembly 62 to be adjusted.

In particular, the first and second side walls 332 and 334 define first and second guide openings 390 and 392, respectively. The guide openings receive the extension guides 362 of the first and second extension platforms 322 and 324, respectively. Displacing the extension platforms 322 and 324 fully inwardly extends the guide tips 382 past the stop projections 344 and 346 (see, e.g., the left side of FIGS. 10-12) to place the extension platforms 322 and 324 in a retracted position relative to the main platform 320. The lock pins 364 may be inserted through the aligned holes 378 and 388 to secure the extension platforms 322 and 324 in their retracted configurations.

Displacing the extension platforms 322 and 324 outwardly until the tip surfaces 384 of the guide tips 382 engage the stop projections 344 and 346 (see, e.g., the right side of FIG. 10) places the extension platforms 322 and 324 in an extended position relative to the main platform 320. The lock pins 364 may be inserted through the aligned holes 378 and 388 to secure the extension platforms 322 and 324 in their extended configurations.

The extension platforms 322 and 324 may be removed from the main platform 320 by tilting the extension platforms 322 and 324 such that the guide tips 382 can clear the stop projections (see, e.g., right side of FIGS. 11 and 12) and then pulling the extension platforms 322 and 324 out until the extension guides 362 are removed from the guide openings 390 and 392 (see, e.g., right side of FIG. 12). FIG. 13 illustrates the surface area of the cargo platform assembly 62 with the first and second extension platforms 322 and 324 extended, and FIG. 14 illustrates the surface area of the cargo platform assembly 62 with both extension platforms 322 and 324 removed.

What is claimed is:

1. A lift system for supporting cargo on a vehicle comprising a vehicle frame, the lift system comprising:
   a cargo platform assembly configured to support the cargo; and
   a displacement system comprising
      a lift frame assembly rigidly connected to the vehicle frame, a drive system operatively connected to the lift frame assembly for axially rotating at least one drive axle about a drive axle axis, at least one drive link assembly supported for pivoting movement relative to the lift frame assembly about the drive axle axis and to the cargo platform assembly about a first distal axis, where the at least one drive axle is operatively connected to the at least one drive link assembly, at least one stabilizer link assembly supported for pivoting movement relative to the lift frame assembly about a stabilizer axis and to the cargo platform assembly about a second distal axis; whereby operation of the drive system causes axial rotation of the at least one drive axle;

axial rotation of the at least one drive axle causes the at least one drive link assembly to pivot about the drive axle axis;

pivoting of the at least one drive link assembly the drive axle axis displaces the cargo platform between a stowed configuration and a lowered configuration; and displacement of the cargo platform between the stowed configuration and the lowered configuration causes rotation of the at least one stabilizer link assembly; and the first and second distal axes are
forward of the drive axle axis and the stabilizer axis when the lift system is in the stowed configuration, and
rearward of the drive axle axis and the stabilizer axis when the lift system is in the lowered configuration.

2. A lift system as recited in claim 1, in which the cargo platform comprises:
a main platform assembly; and
at least one extension platform assembly supported for movement between a retracted position and an extended position relative to the main platform assembly.

3. A lift system as recited in claim 1, in which the cargo platform assembly is supported at least partly by the vehicle when the lift system is in the stowed configuration.

4. A lift system as recited in claim 1, in which the cargo platform assembly is supported at least partly by the ground when the lift system is in the lowered configuration.

5. A lift system as recited in claim 1, further comprising a hitch jack assembly that supports the vehicle when the lift system is moved between the stowed configuration and the lowered configuration.

6. A lift system as recited in claim 1, in which the lift frame assembly comprises at least one bearing assembly for supporting the at least one drive axle for axial rotation about the drive axle axis.

7. A lift system as recited in claim 1, in which the drive system comprises:
a drive frame assembly rigidly supported relative to the lift frame assembly; and
an actuator comprising an actuator cylinder and a drive rod;
whereby
the actuator cylinder is supported by the drive frame assembly;
the drive rod is operatively connected to the at least one drive axle; and
operation of the actuator displaces the drive rod relative to the cylinder to cause axial rotation of the at least one drive axle.

8. A lift system as recited in claim 7, further comprising at least one drive plate for transmitting displacement of the drive rod into axial rotation of the at least one drive axle.

9. A method of supporting cargo on a vehicle comprising a vehicle frame, the method comprising the steps of:
providing a cargo platform assembly configured to support the cargo;
rigidly connecting a lift frame assembly to the vehicle frame;
operatively connecting a drive system to the lift frame assembly for axially rotating at least one drive axle about a drive axle axis
operatively connecting the at least one drive axle to the at least one drive link assembly for pivoting movement relative to the lift frame assembly about the drive axle axis;
operatively connecting the at least one drive link assembly to the cargo platform assembly for pivoting movement about a first distal axis,
supporting at least one stabilizer link assembly for pivoting movement relative to the lift frame assembly about a stabilizer axis,
operatively connecting the at least one stabilizer link assembly to the cargo platform assembly for pivoting movement about a second distal axis;
operating the drive system to cause axial rotation of the at least one drive axle, whereby
axial rotation of the at least one drive axle causes the at least one drive link assembly to pivot about the drive axle axis,
pivoting of the at least one drive link assembly the drive axle axis displaces the cargo platform between a stowed configuration and a lowered configuration,
displacement of the cargo platform between the stowed configuration and the lowered configuration causes rotation of the at least one stabilizer link assembly, and
the first and second distal axes are
forward of the drive axle axis and the stabilizer axis when the lift system is in the stowed configuration; and
rearward of the drive axle axis and the stabilizer axis when the lift system is in the lowered configuration.

10. A method as recited in claim 9, in which the step of providing the cargo platform comprises the steps of:
providing a main platform assembly; and
supporting at least one extension platform assembly for movement between a retracted position and an extended position relative to the main platform assembly.

11. A method as recited in claim 9, further comprising the step of supporting the cargo platform assembly at least partly by the vehicle when the lift system is in the stowed configuration.

12. A method as recited in claim 9, further comprising the step of supporting the cargo platform assembly at least partly by the ground when the lift system is in the lowered configuration.

13. A method as recited in claim 9, further comprising the step of arranging a hitch jack assembly to support the vehicle when the lift system is moved between the stowed configuration and the lowered configuration.

14. A lift system for supporting cargo on a vehicle comprising a vehicle frame, the lift system comprising:
a cargo platform assembly configured to support the cargo, the cargo assembly comprising a main platform assembly, and at least one extension platform assembly supported for movement between a retracted position and an extended position relative to the main platform assembly; and a displacement system comprising a lift frame assembly rigidly connected to the vehicle frame, a drive system operatively connected to the lift frame assembly for axially rotating at least one drive axle about a drive axle axis, first and second drive link assemblies supported for pivoting movement relative to the lift frame assembly about the drive axle axis and to the cargo platform assembly about a first distal axis, where the at least one drive axle is operatively connected to the first and second drive link assemblies, first and second stabilizer link assemblies supported for pivoting movement relative to the lift frame assembly about a stabilizer axis and to the cargo platform assembly about a second distal axis; whereby operation of the drive system causes axial rotation of the at least one drive axle;

axial rotation of the at least one drive axle causes the first and second drive link assemblies to pivot about the drive axle axis;

pivoting of the first and second drive link assemblies the drive axle axis displaces the cargo platform between a stowed configuration and a lowered configuration;

displacement of the cargo platform between the stowed configuration and the lowered configuration causes rotation of the first and second stabilizer link assemblies; and the first and second distal axes are forward of the drive axle axis and the stabilizer axis when the lift system is in the stowed configuration, and rearward of the drive axle axis and the stabilizer axis when the lift system is in the lowered configuration.

15. A lift system as recited in claim 14, in which the at least one drive axle comprises a first drive axle operatively connected to the first drive link assembly and a second drive axle operatively connected to the first drive link assembly.

16. A lift system as recited in claim 14, in which the cargo platform assembly is supported at least partly by the vehicle when the lift system is in the stowed configuration.

17. A lift system as recited in claim 14, in which the drive system comprises:

a drive frame assembly rigidly supported relative to the lift frame assembly; and an actuator comprising an actuator cylinder and a drive rod; whereby the actuator cylinder is supported by the drive frame assembly;

the drive rod is operatively connected to the at least one drive axle; and operation of the actuator displaces the drive rod relative to the cylinder to cause axial rotation of the at least one drive axle.

18. A lift system as recited in claim 17, further comprising at least one drive plate for transmitting displacement of the drive rod into axial rotation of the at least one drive axle.

* * * * *